(12) United States Patent
Franklin

(10) Patent No.: US 7,175,868 B2
(45) Date of Patent: Feb. 13, 2007

(54) ASSEMBLY AND METHOD FOR DEMOLDING A BODY OF FROZEN CONFECTION

(75) Inventor: Peter B. Franklin, Concord, MA (US)

(73) Assignee: Cool Dog, Inc., Shirley, MA (US)

( * ) Notice: Subject to any disclaimer, the term of this patent is extended or adjusted under 35 U.S.C. 154(b) by 8 days.

(21) Appl. No.: 11/188,331

(22) Filed: Jul. 25, 2005

(65) Prior Publication Data

US 2006/0019010 A1    Jan. 26, 2006

Related U.S. Application Data

(60) Provisional application No. 60/591,263, filed on Jul. 26, 2004.

(51) Int. Cl.
*A23G 9/28*    (2006.01)
*A23P 1/00*    (2006.01)

(52) U.S. Cl. .............. 426/389; 425/472; 425/301; 426/393; 426/414; 426/524

(58) Field of Classification Search ................ 426/524, 426/389, 393, 414; 425/296, 301, 122, 472; 53/514, 518, 520, 528
See application file for complete search history.

(56) References Cited

U.S. PATENT DOCUMENTS

| | | | | |
|---|---|---|---|---|
| 2,156,466 | A | * | 5/1939 | Vogt ........................... 53/451 |
| 2,563,278 | A | * | 8/1951 | Rummel et al. ............ 426/393 |
| 4,830,864 | A | * | 5/1989 | Zevlakis ..................... 426/393 |
| 5,281,429 | A | * | 1/1994 | Zevlakis ..................... 426/389 |
| 6,156,357 | A | | 12/2000 | Franklin |
| 7,052,727 | B2 | * | 5/2006 | Franklin et al. ............ 426/389 |
| 2004/0234642 | A1 | | 11/2004 | Franklin et al. |

* cited by examiner

*Primary Examiner*—Robert B. Davis
(74) *Attorney, Agent, or Firm*—Pandiscio & Pandiscio; Scott R. Foster

(57) ABSTRACT

A method for demolding a body of frozen confection encased in a flexible disposable mold includes the steps of slicing the mold, applying heat to the mold sufficient to soften a surface portion of the body of confection to permit the mold to slip from the body, directing gas into the slit mold to open the mold and to separate the mold from the body, and applying suction to the mold to pull the mold free of the body. The invention further includes an assembly for effecting the method, the assembly including a slicer, a heater, a blower, and a suction device.

23 Claims, 9 Drawing Sheets

ASSEMBLY AND METHOD FOR DEMOLDING A BODY OF FROZEN CONFECTION

CROSS-REFERENCE TO RELATED APPLICATION

This application claims the benefit of U.S. Provisional Patent Application Ser. No. 60/591,263, filed Jul. 26, 2004 in the name of Peter B. Franklin.

BACKGROUND OF THE INVENTION

1. Field of the Invention

The invention relates to the production of ice cream products, and is directed more particularly to an assembly and method for separating a flexible disposable mold in which a confection body has previously been formed and frozen, from the body of frozen confection, such as ice cream.

2. Description of the Prior Art

In U.S. Pat. No. 6,156,357, issued Dec. 5, 2000 to Peter B. Franklin, there is disclosed a frozen confection type food product, one component of which is a generally cylindrically-shaped frozen confection such as ice cream, sherbet, yogurt, custard, and the like.

In U.S. Patent Application Publication US 2004/0234642, published Nov. 25, 2004 and incorporated herein by reference, there is disclosed an assembly and method for forming a frozen confection in a mold comprising a flexible inert casing. Inasmuch as the product disclosed in U.S. Pat. No. 6,156,357 includes the frozen confection without the casing, it is necessary in producing the product to separate the casing from the confection body. In the aforesaid Publication, it is said that such separation may be undertaken by slicing open the mold, or casing, and separating the mold from the confection body. It is suggested that the slicing operation may be effected by a slicing device generally of the type used to peel skin off sausage to provide skinless sausage.

Experience has shown, however, that merely slicing open the confection mold sometimes fails to render the mold and confection readily separable. On occasion, the confection fails separate from the mold because the mold and confection are essentially frozen together and do not readily separate.

Accordingly, there is a need for an assembly and method for automatically slicing through the mold and thereafter removing the mold from the frozen confection, even when the temperature of the mold and confection is such as to discourage separation.

SUMMARY OF THE INVENTION

An object of the invention is, therefore, to provide an assembly for demolding a frozen confection which is encased in a flexible and disposable frozen mold.

A further object of the invention is to provide a method for demolding a frozen confection which is in a flexible and disposable frozen mold.

With the above and other objects in view, as will hereinafter appear, a feature of the present invention is the provision of an assembly for demolding a body of frozen confection encased in a disposable flexible mold. The assembly comprises a slicer for slicing through the mold along a length thereof, a heater for applying heat to an outside surface of the mold sufficient to cause softening of a surface of the body of confection to permit the sliced mold to slip from the body, a blower for further opening the mold and for separating the mold from the body, and a suction device for pulling the mold free of the body and accumulating removed molds.

In accordance with a further feature of the invention, there is provided a method for demolding a body of frozen confection encased in a flexible disposable mold. The method includes the steps of slicing through the mold along a length thereof, applying heat to the mold sufficient to cause softening of a surface portion of the body of confection to permit the sliced mold to slip from the body, directing air into the sliced mold to open the mold and to separate the mold from the body, and applying suction to the mold to pull the mold free of the body.

The above and other features of the invention, including various novel details of construction and combinations of parts and method steps, will now be more particularly described with reference to the accompanying drawings and pointed out in the claims. It will be understood that the particular assembly and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein.

DESCRIPTION OF THE PREFERRED EMBODIMENTS

Figure 1:
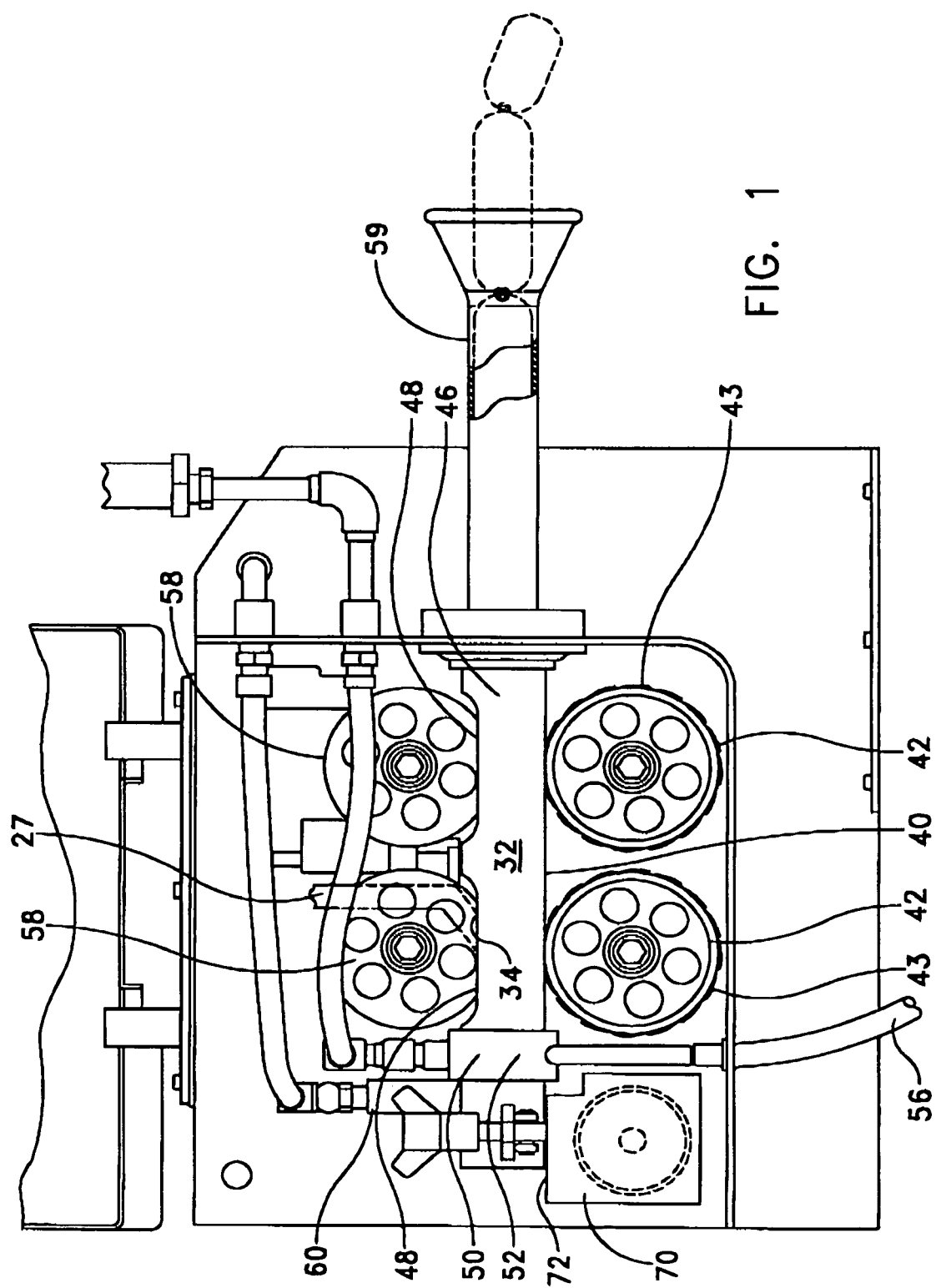
FIG. 1 is a side elevational view of one form of assembly illustrative of an embodiment of the invention.
Figures 2, 3:
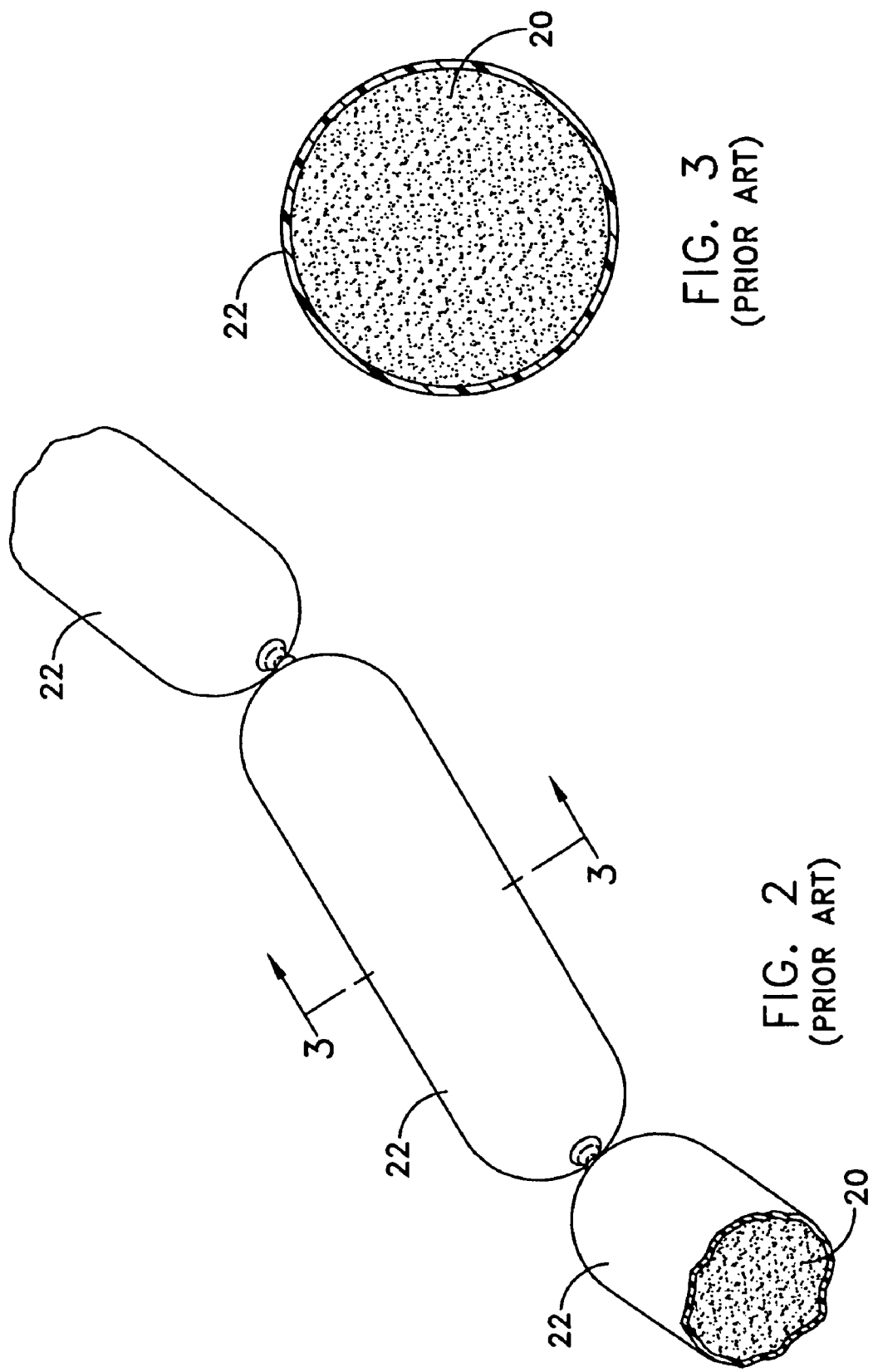
FIG. 2 is a perspective view, partly broken away, of an illustrative frozen confection encased in an illustrative flexible disposable mold.
FIG. 3 is a sectional view taken along line 3—3 of FIG. 2.
Figure 4:
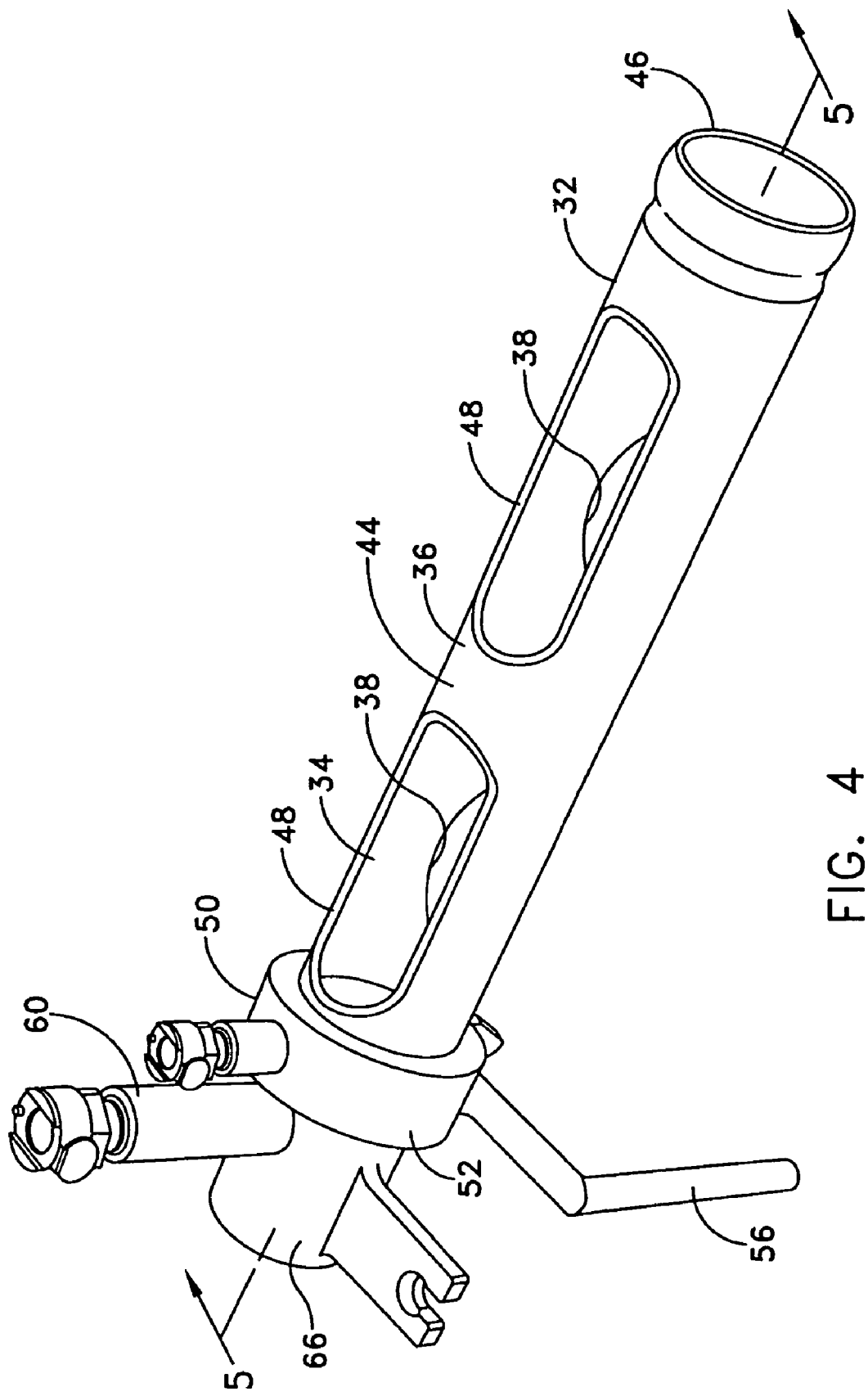
FIG. 4 is a perspective view of a tubular guide member for retaining confections undergoing the demolding operation.
Figure 5:
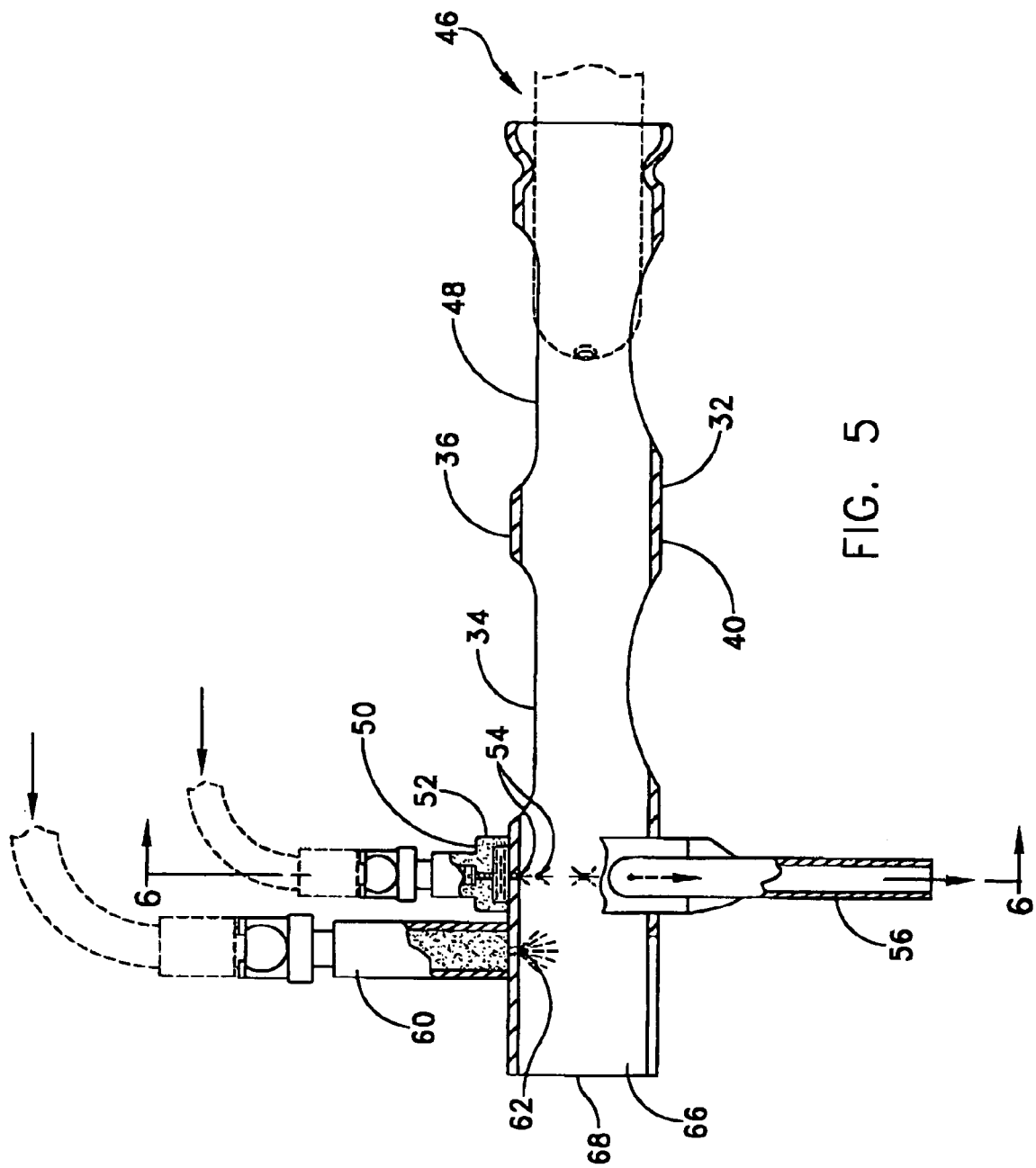
FIG. 5 is a sectional view taken along line 5—5 of FIG. 4.
Figure 7:
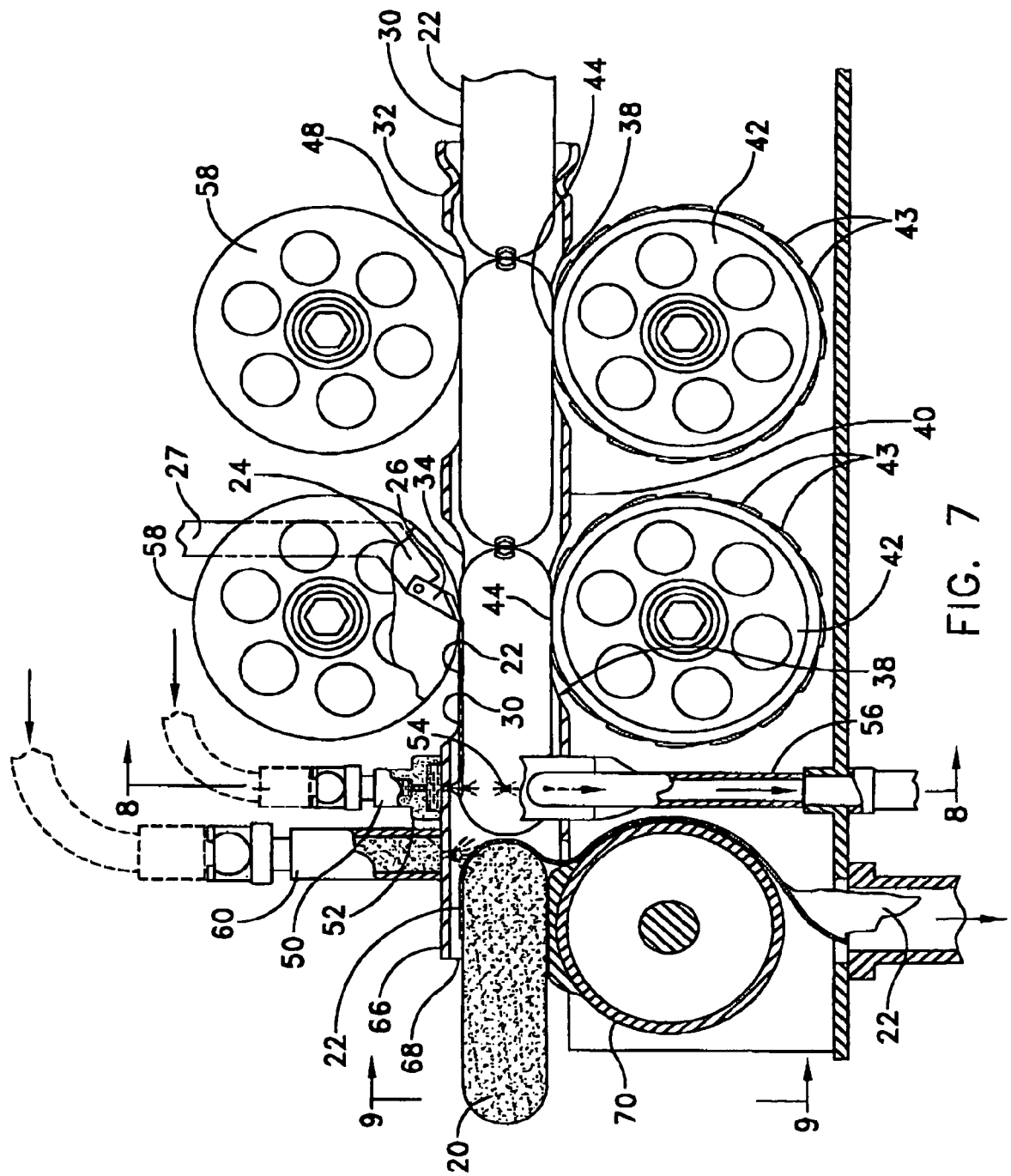
FIG. 7 is a sectional view, partly in side elevation, and in part broken away, of the assembly of FIG. 1 with confections as shown in FIG. 2 passing therethrough.

Referring to FIG. 1, it will be seen that an illustrative assembly for separating a body 20 (FIGS. 2 and 3) of frozen confection from a flexible disposable mold 22, which comprises a skin or casing enveloping the body 20, includes a slicer 24 (FIG. 7) for slicing through the mold 22 along the length thereof.

The slicer 24 includes a blade 26 mounted on a slicer support 27 and engageable with the leading end and substantially the entire length of an upper surface 30 of the mold 22. The slicer blade 26 is disposed in such a manner as to effect a blade penetration of the mold and body of about ¼ inch. Inasmuch as some condensation and/or ice crystals may manifest on the outside of the mold 22, the blade 26 is required to extend into the mold and body 20 by about ¼ inch to insure penetration of ice crystals as well as the mold.

The assembly is provided with a guide member 32 (FIGS. 1, 4, 5 and 7) for retaining the body 20 and mold 22 and facilitating transit thereof into position for receiving the blade 26. Preferably, the guide member 32 comprises a tube having an opening 34 in a wall portion 36 thereof. The blade 26 extends through the opening 34 (FIG. 7) to engage the mold 22 and the body 20.

The tubular guide member 32 is provided with at least one opening 38 (FIGS. 4 and 7), and preferably a plurality of such openings, on an undersurface 40 of the wall portion 36. One or more drive rollers 42, with width-wise peripheral ridges 43 (FIGS. 1 and 7) thereon, are disposed on the assembly such that a peripheral portion 44 thereof extends upwardly, as viewed in the drawings, through the openings 38 (FIG. 7) to engage the mold 22 and drive the mold 22 and body 20 therein through the tube 32 and beyond.

The tubular guide member 32 is further provided with one or more orifices 48, including the opening 34, on an upper surface 49 of the guide member 32 (FIG. 4) through which extend pressure wheels 58 (FIGS. 1 and 7) which steady the body and mold units in transit and hold them at the correct level for the slicing operation of the blade 26.

Thus, a mold and body combination is fed into an entry end 46 of the tube 32, as by way of an entry tube 59 (FIG. 1) and is driven by the rollers 42 through the tube 32 wherein the blade 26 slits the mold 22 at the forward end of the mold and along the length thereof.

Upon leaving the slicer 24, the body 20 and sliced mold 22 enter a heater 50 (FIGS. 1, 5 and 7) for application of heat to the outside surface of the mold 22 sufficient to cause slight softening of the surface of the confection body 20 to permit the mold 22 to slip from the body 20.

Figure 6:
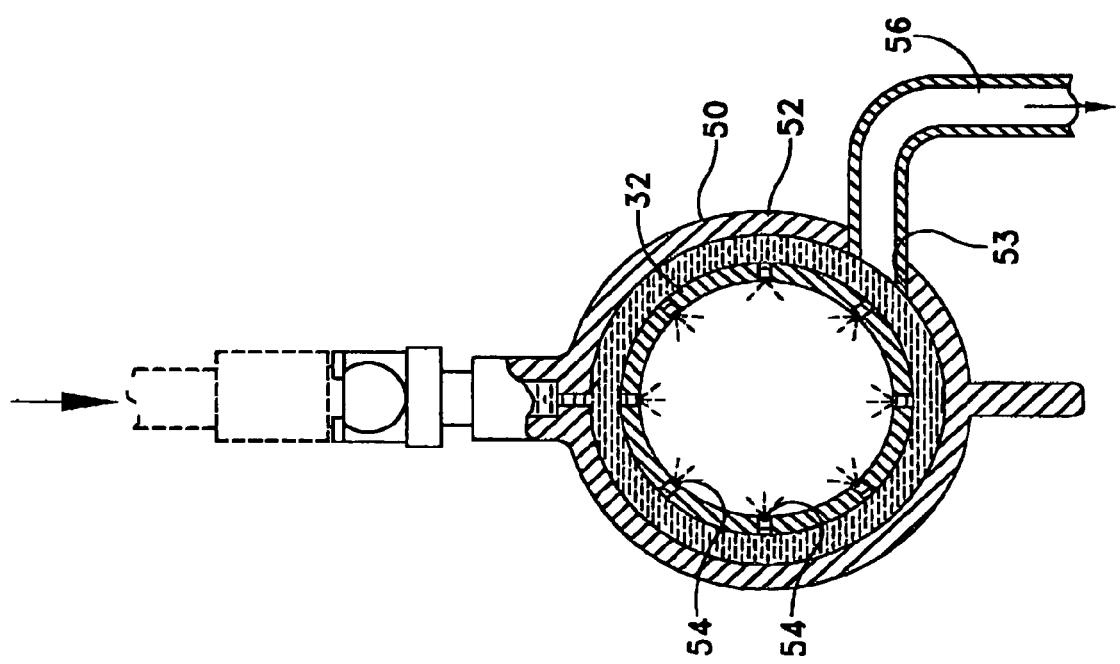
FIG. 6 is a sectional view taken along line 6—6 of FIG. 5.
Figure 8:
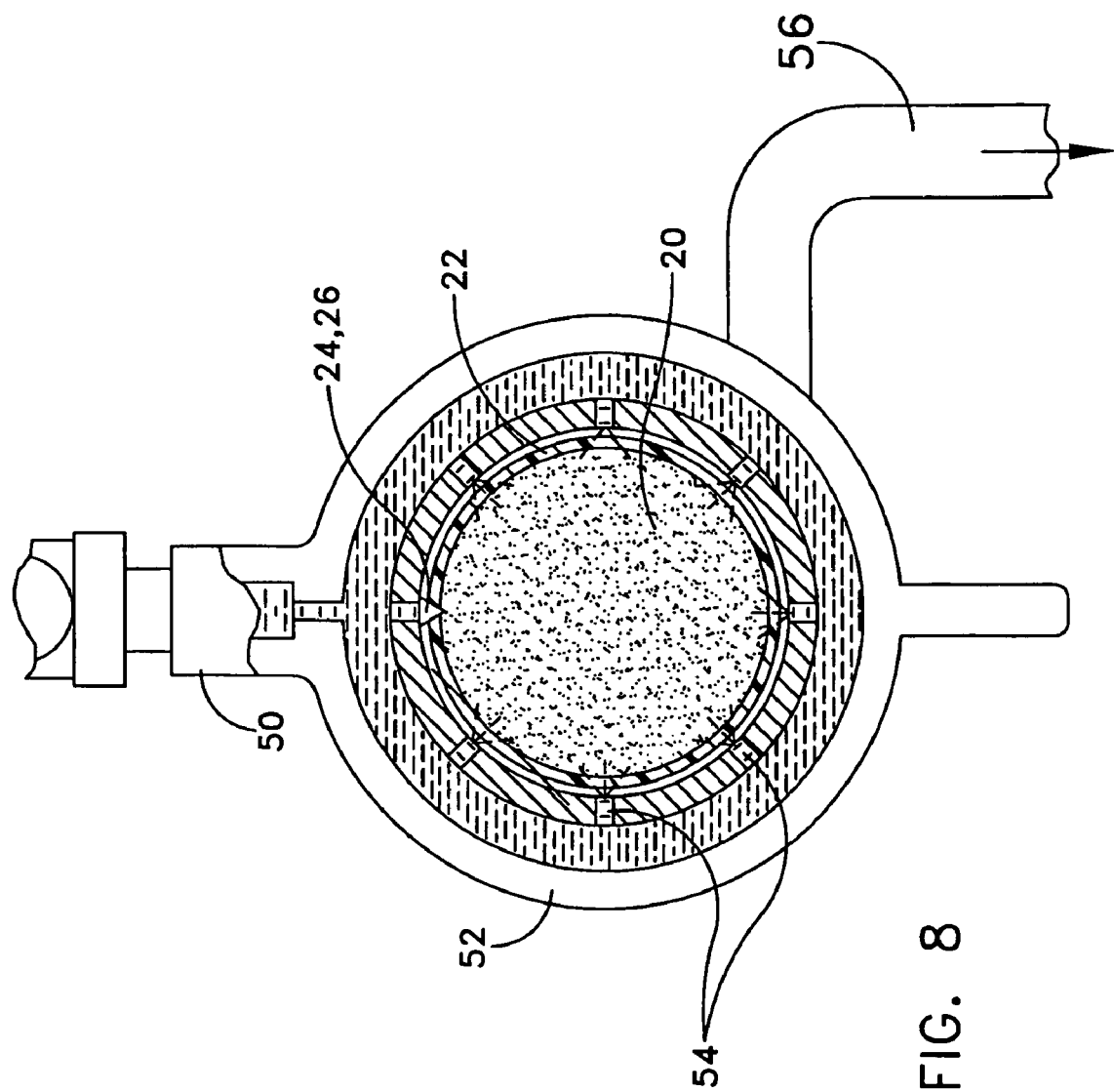
FIG. 8 is a sectional view taken along line 8—8 of FIG. 7.

The heater 50 includes a hollow ring member 52 (FIG. 4) adapted to receive a heated medium, preferably steam, and to release the heated medium through a plurality of orifices 54 (FIGS. 5, 6, and 8) to impinge upon the mold 22 (FIG. 8) to slightly melt a surface area of the confection, such that the mold can readily part from the confection. The ring member 52 is provided with a drain hole 53 (FIG. 6) in communication with a drain line 56 for drainage of any condensate developing in the ring member 52. The orifices 54 are evenly dispersed around the ring member 52 to evenly apply heat around the body 20, to minimize the extent of the heating, and to insure that no "cold spots" exist on the surface of the confection otherwise which might continue sticking to the mold.

The confection which is fed into the entry tube 59 is at a temperature of about −25° F. The heater 50 causes the surface of the confection to melt only very slightly, just enough to effect release of the mold 22 from the body 20. After passing from the heater 50, the confection, which has essentially remained at −25° F. at the core thereof, re-freezes at the surface thereof within seconds, preventing the build-up of crystals and maintaining the quality of the frozen confection.

Moving out of the heater area, the mold and body immediately encounter a blower 60 for opening the mold 22 and for separating the mold from the body 20.

The blower 60 is provided with one or more nozzles 62, (FIG. 5)for applying jets of gas, preferably compressed filtered air, to open the slit cut by the slicer 24 and to urge the mold off the body. The jets are adapted to apply minimal, evenly dispersed compressed gas, so as to minimize spraying of the confection, which may still exhibit some slight melt at the surface thereof.

Immediately after encountering the blower 60, the body 20 and the partially removed mold 22 are subjected to a suction device 70 (FIGS. 1 and 7), which draws the mold 22 down from the body 20, completely separating one from the other if such has not theretofore occurred, leaving the confection body to enter a tube discharge end portion 66.

The blower 60 is mounted on the tube discharge end portion 66 which is aligned with the remainder of the tube 32 and is adapted to receive the mold and body and to position same during operation of the suction device 70 pulling the mold free of the body.

Figure 9:
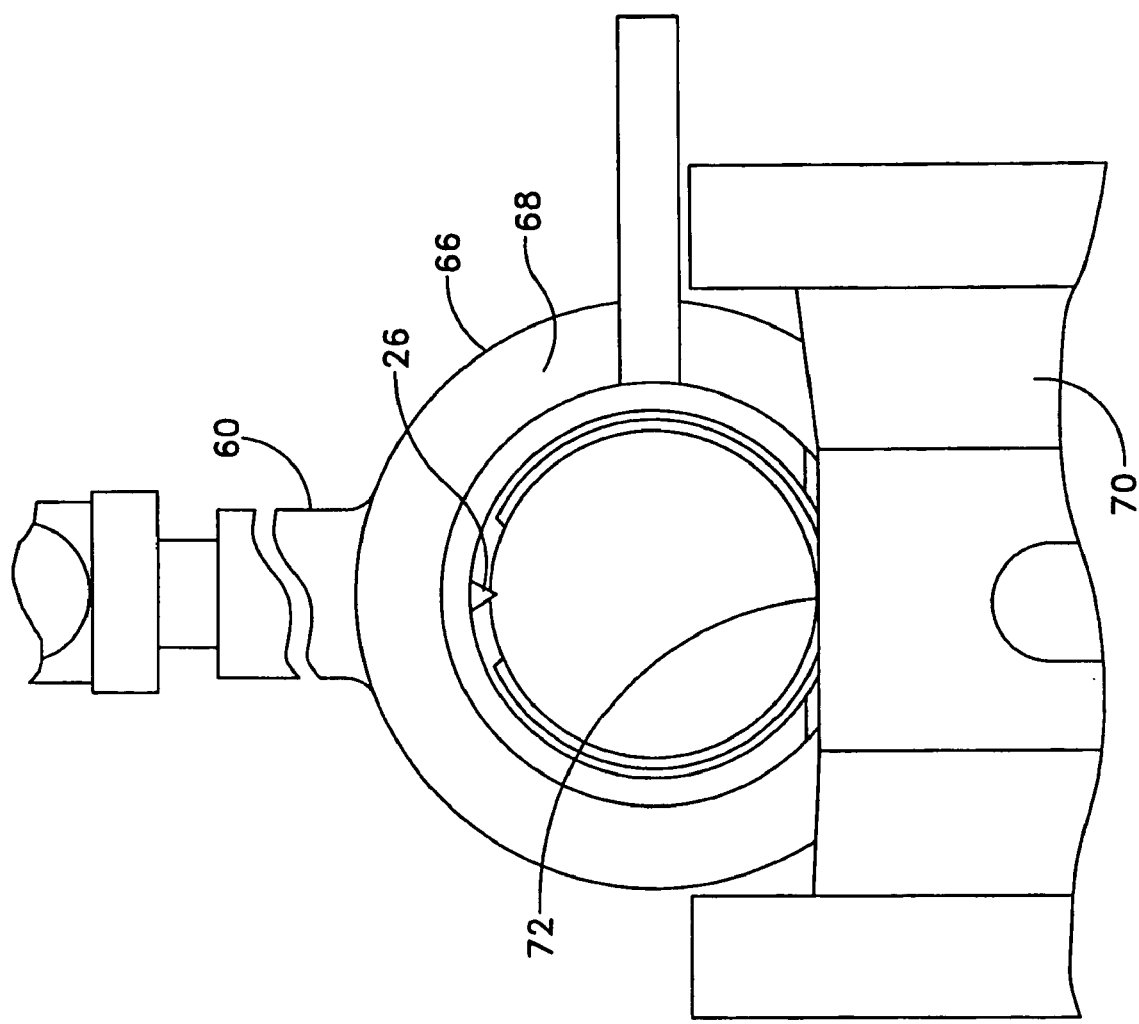
FIG. 9 is an end elevational view taken from line 9—9 of FIG. 7.
Figure 11:
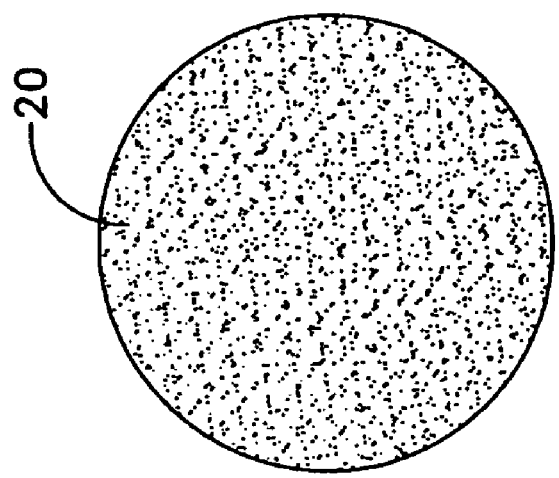
FIG. 11 is a sectional view taken along line 11—11 of FIG. 10.
Figure 10:
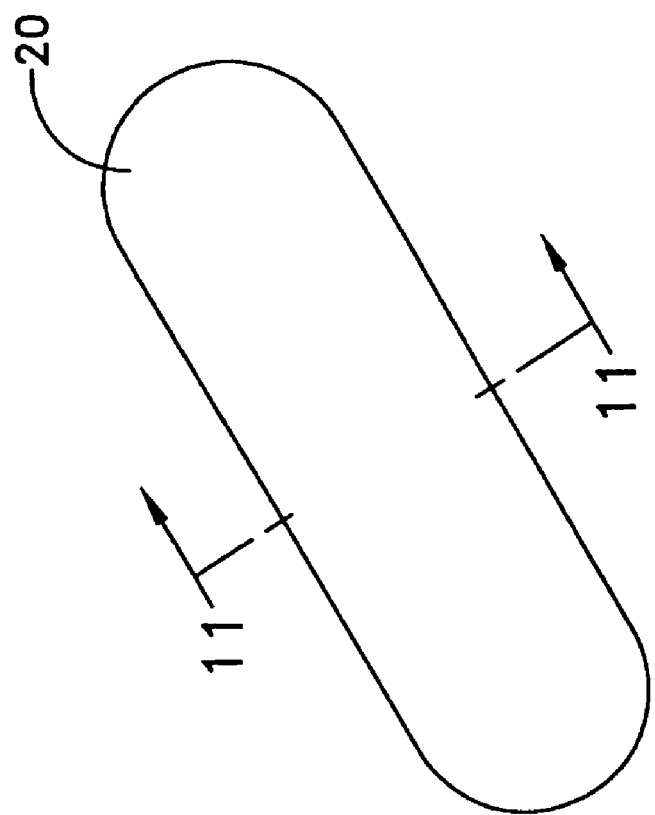
FIG. 10 is a perspective view of an illustrative confection after demolding.

At an exit end 68 (FIG. 7) of the tube end portion 66, the confection body 20, completely divorced from the mold 22, is received by a slide member 72 (FIGS. 1 and 9) which guides and supports the body as the body departs from the exit end 68 of the tube end portion 66. The departing body 20 is of confection only, having been separated from the mold or casing 22 (FIGS. 10 and 11).

Preferably, the assembly is provided with support members (not shown), such as beams or brackets, for supporting a sterile removable tray or other receptacle, such as a moving belt, in position for receiving frozen confection bodies from the tube exit end 68.

The above described assembly may be used to practice a method for demolding a body of frozen confection from a disposable flexible mold. The method includes the steps of slicing through the mold, applying heat to the mold sufficient to cause softening of a surface portion of the body of confection to permit the slit mold to slip from the body, directing a gas jet into the sliced mold to open the mold and to separate the mold from the body, and applying a suction to the mold to pull the mold free of the body.

The method may include the further step of moving the body to a sterile removable tray or other receptacle.

It will be understood that the present invention is by no means limited to the particular assembly and method herein disclosed and/or shown in the drawings, but also comprises any modification or equivalent within the scope of the following claims.

What is claimed is:

1. An assembly for demolding a body of frozen confection encased in a disposable flexible mold, the assembly comprising:
   a slicer for slicing through the mold along a length thereof;
   a heater for applying heat to an outside surface of the sliced mold sufficient to cause softening of a surface of the body of confection to permit the mold to slip from the body;
   a blower for opening the mold and for separating the mold from the body; and
   a suction device for pulling the mold free of the body.

2. The assembly in accordance with claim 1 wherein the assembly further comprises a guide member for retaining the body and mold and facilitating transit thereof, and said slicer comprises a blade adapted for the slicing of the mold while the body and mold are in said guide member.

3. The assembly in accordance with claim 2 wherein said guide member comprises a tube having an opening in a wall portion thereof, and said blade is disposed so as to pass through the tube opening to effect the slicing of the mold.

4. The assembly in accordance with claim 3 wherein said blade is adapted to penetrate the mold and the frozen confection to a depth of about ¼ inch.

5. The assembly in accordance with claim 1 wherein said heater comprises a hollow ring member provided with orifices, said ring member being adapted to receive a heated medium and to release the heated medium through the orifices to impinge upon the outside surface of the mold.

6. The assembly in accordance with claim 5 wherein the heated medium comprises steam.

7. The assembly in accordance with claim 6 wherein said ring member is provided with a drain means for the drainage of condensate from said ring member.

8. The assembly in accordance with claim 1 wherein said blower comprises nozzle means for applying jets of gas to open a slit cut by said slicer and to urge the mold off the body.

9. The assembly in accordance with claim 3 wherein said blower is mounted proximate a discharge end portion of said tube, said discharge end tube portion being adapted to receive the body from said tube and to retain the body during operation of said blower and said suction device to pull the mold free of the body.

10. The assembly in accordance with claim 9 wherein said suction device is operative to pull the mold from the discharge tube.

11. The assembly in accordance with claim 10 and further comprising an exit slide member for receiving the body exiting said discharge end portion of said tube and directing the body from the exit end of said discharge tube end portion.

12. The assembly in accordance with claim 3 wherein said tube is provided with a further opening, and the assembly further comprises a roller mounted adjacent said tube, a peripheral portion of said roller extending through the further opening and adapted to engage the mold to move the body and mold through said tube.

13. The assembly in accordance with claim 12 wherein the peripheral portion of said roller is ribbed widthwise of the peripheral portion of said roller.

14. A method for demolding a body of frozen confection encased in a disposable flexible mold, the method comprising the steps of:

slicing the mold along a length thereof;
applying heat to an outside surface of the mold sufficient to cause softening of a surface portion of the body of confection to permit the mold to slip from the body;
directing a gas jet into the sliced mold to open the mold and to separate the mold from the body; and
applying suction to the mold to pull the mold free of the body.

15. The method in accordance with claim 14 wherein the mold is an elongated tubular member and the step of slicing through the mold comprises:

moving the mold along a guide member; and
applying a blade to the moving mold to effect the slicing of the mold.

16. The method in accordance with claim 15 wherein the guide member comprises a tube having an opening in a wall portion thereof, and applying the blade comprises extending the blade through the opening to effect the slicing of the mold.

17. The method in accordance with claim 16 wherein the body is fed into the tube at a temperature of about −25° F.

18. The method in accordance with claim 15 wherein the blade is applied so as to penetrate the mold and the frozen confection about ¼ inch.

19. The method in accordance with claim 15 wherein after the step of slicing of the mold, the mold and body are moved into and through a ring member comprising a hollow ring provided with orifices, and providing a heated medium within the ring member which passes through the orifices to impinge upon the outside surface of the mold.

20. The method in accordance with claim 19 wherein the step of providing a heated medium comprises providing steam which, through the orifices, is evenly dispersed around the mold.

21. The method in accordance with claim 20 and further comprising continuously draining from the ring any condensate therein.

22. The method in accordance with claim 14 wherein the step of directing a gas jet into the sliced mold comprises applying a jet of gas to open the sliced mold, and to push the mold off the body.

23. The method in accordance with claim 22 wherein the jet of gas is limited to a velocity minimizing spraying of the softened body surface.

* * * * *